United States Patent [19]

Raymer

[11] 4,354,646
[45] Oct. 19, 1982

[54] VARIABLE DIHEDRAL ANGLE TAIL UNIT FOR SUPERSONIC AIRCRAFT

[75] Inventor: Daniel P. Raymer, Del Aire, Calif.

[73] Assignee: Rockwell International Corporation, El Segundo, Calif.

[21] Appl. No.: 139,387

[22] Filed: Apr. 11, 1980

Related U.S. Application Data

[63] Continuation of Ser. No. 944,058, Sep. 20, 1978, abandoned.

[51] Int. Cl.³ .......................... B64C 5/10; B64C 9/08
[52] U.S. Cl. ...................................... 244/87; 244/47
[58] Field of Search ............. 244/13, 36, 45 R, 45 A, 244/46, 47, 49, 75 R, 87, 88, 89, 90 R, 91, 160, 161, 162, 201

[56] References Cited

U.S. PATENT DOCUMENTS

| | | | |
|---|---|---|---|
| 2,741,444 | 4/1956 | Baynes | 244/46 |
| 3,104,079 | 9/1963 | Phillips | 244/162 |
| 3,104,082 | 9/1963 | Polhamus | 244/49 |
| 3,132,825 | 5/1964 | Postle et al. | 244/36 |
| 3,369,771 | 2/1968 | Walley et al. | 244/162 |
| 3,493,197 | 2/1970 | Spearman | 244/87 |

*Primary Examiner*—Charles E. Frankfort
*Attorney, Agent, or Firm*—Charles T. Silberberg

[57] ABSTRACT

An aircraft having supersonic and subsonic flight capabilities which utilizes a variable dihedral angle tail unit to vary the aircraft geometry to improve aerodynamic efficiency, especially when changing from subsonic to supersonic speeds and vice versa, which saves propulsion energy and can be used to present minimal radar cross section from a given direction.

18 Claims, 3 Drawing Figures

VARIABLE DIHEDRAL ANGLE TAIL UNIT FOR SUPERSONIC AIRCRAFT

This is a continuation of application Ser. No. 944,058, filed Sept. 20, 1978, now abandoned.

BACKGROUND OF THE INVENTION

This invention relates generally to aerial vehicles, and relates with particularity to supersonic aircraft having excellent subsonic flight capabilities and utilizing a variable dihedral tail unit to vary the aircraft geometry.

One of the major problems for the design of supersonic aircraft is the variation of center of lift with Mach number. The variation generally encountered consists of a rearward shift in center of lift in going from subsonic to supersonic speeds with an attendant increased trim drag. The significant factor contributing to this change in center of lift is the rearward shift of wing center of pressure.

For low speed flight, and for takeoff and landing, it is desirable that there be horizontal tail surfaces to take maximum advantage of the tail moment arm in providing stability and control. However, for supersonic flight, the horizontal tails increase drag and are unnecessary if the aircraft center of gravity is aligned with the supersonic center of lift.

To compensate for the wing center of pressure shift, the current practice is to shift fuel to reposition the center of gravity of the aircraft. This requires installation of a separate fuel transfer system in the aircraft to pump a massive amount of fuel either forward or aft as required. This system, which is normally used only when traversing through the Mach 1 region, is inefficient, quite costly, and requires excess fuel capacity. An alternate approach has been to use retractable canard surfaces. However, this adds extra surfaces and the control mechanisms therefor which increase weight and drag, especially during supersonic flight.

PRIOR ART STATEMENT

U.S. Pat. Nos. 3,493,197 to Spearman and 4,008,867 to Kaniut utilize a horizontal tail whih can be translated to compensate for variation of longitudinal stability. Such systems are quite complex and expensive. Such horizontal tail surfaces are translated horizontally rather than being rotatable about an axis parallel to the longitudinal axis of the fuselage. They are never used for directional stability. No disclosure of any kind is made as to reduction of radar cross section.

U.S. Pat. No. 2,418,301 to Heal discloses rotatable wing tip portions. This invention is normally applicable to tailless types of aircraft. As such, the wing tips can be raised to provide fin and rudder surface as required. This invention does not relate to compensating for variation of center of lift with Mach number. The wing tip portions are of course not tail control surfaces extending outwardly from the fuselage and pivotally mounted to the upper body of the aft end of the fuselage. Further, no disclosure of positioning a tail control surface as a function of stealth is made.

SUMMARY OF THE INVENTION

It is, therefore, an object of the present invention to provide a variable dihedral tail unit for supersonic aircraft.

It is another object of the present invention to provide a variable dihedral tail unit for supersonic aircraft which is economical and of minimum complexity.

It is yet another object of the present invention to provide a variable dihedral tail unit for supersonic aircraft that reduces air resistance during supersonic flight, thus saving propulsion energy, while providing safe takeoff and landing characteristics.

It is still another object of the present invention to provide a variable dihedral angle tail unit for supersonic aircraft which provides improved aerodynamic efficiency and capability for reduction in radar cross section.

Briefly, in accordance with the invention, there is provided in a supersonic aircraft, a variable dihedral angle tail unit comprised of two tail control surfaces and a positioning means. The tail control surfaces extend outwardly from the fuselage and are pivotally mounted to the upper body of the aft end of the fuselage. The positioning means rotates each of the tail control surfaces in unison about respective axes substantially parallel to the longitudinal axis of the fuselage.

In the preferred form of the invention, the tail control surfaces are moveable within a range from a vertical position to a predetermined minimum dihedral angle position. The tail control surfaces are rotated by said positioning means equally in opposite directions within the range during subsonic flight as a function of aircraft flight parameters and to the vertical position during supersonic flight.

Other objects and advantages of the invention will become apparent upon reading the following detailed description and upon reference to the drawings.

While the invention will be described in connection with the preferred embodiments, it will be understood that it is not intended to limit the invention to those embodiments. On the contrary, it is intended to cover all alternatives, modifications, and equivalents that may be included within the spirit and scope of the invention as described by the appended claims.

DETAILED DESCRIPTION OF THE INVENTION

Figure 1:
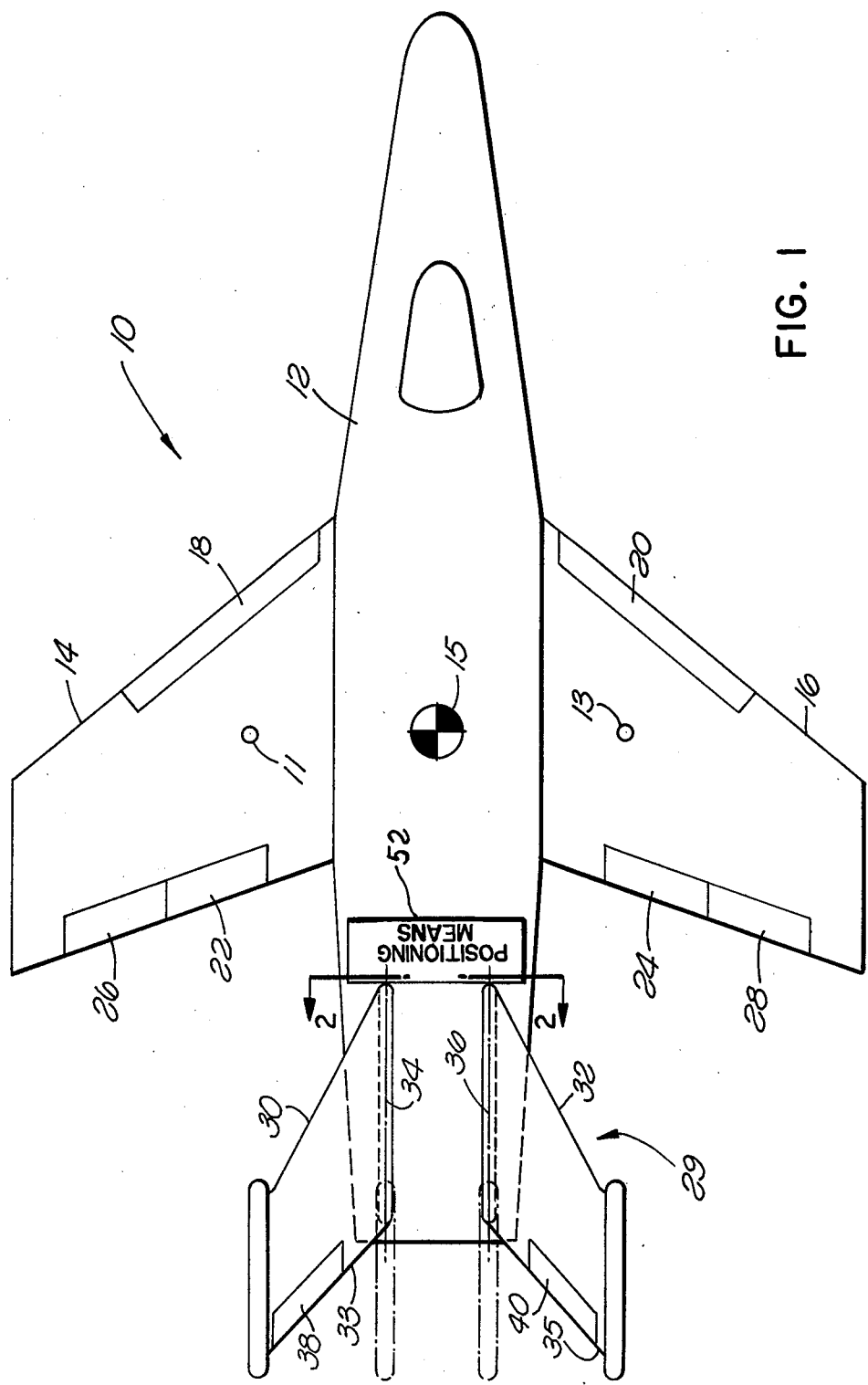
FIG. 1 is an upper plan view of a fighter type supersonic aircraft having a variable dihedral angle tail unit where the tail control surfaces thereof are shown in a subsonic position and in broken lines in a substantially vertical position corresponding to a supersonic condition.

Referring now to FIG. 1 of the drawings, there is shown a variable geometry supersonic fighter-type aircraft generally designated by the reference numeral 10. Aircraft 10 is provided with a conventional fuselage 12 having swept wings 14 and 16 projecting outwardly from each side of fuselage 12. Each wing has respective leading edge slats 18 and 20, flaps 22 and 24, and elevons 26 and 28.

The empennage assembly of the present invention includes a variable dihedral tail unit generally indicated by reference numeral 29 which includes two tail control surfaces 30 and 32. Such surfaces have an airfoil configuration and are essentially trapezoidal in shape in elevational view when positioned vertically. Surfaces 30 and 32 are pivotally attached along hinge lines 34 and 36 to the upper body of the aft end of fuselage 12. Equivalently, surfaces 30 and 32 can be mounted to an extension of the fuselage such as engine inlets positioned along the upper body of the fuselage. Surfaces 30 and 32 extend outwardly from fuselage 12. Each of tail control surfaces 30 and 32 have a trailing edge 33 and 35 respectively along which is positioned respective auxiliary control surfaces 38 and 40. These auxiliary surfaces 38 and 40, which are pivotally connected to the respective trailing edge 33 and 35 of the tail control surfaces 30 and 32, are designated ruddervators since depending upon the position of tail control surfaces 30 and 32, their effect could be to act as a rudder, elevator, or combination of the two.

Any suitable control mechanism (positioning means) 52 for tail control surfaces 30 and 32 and ruddervators 38 and 40 can be provided. These may either be mechanical, electrical, hydraulic, or any combination thereof as is conventional in movement of aerodynamic surfaces for aircraft. Typically, such a control mechanism can be in the form of a jack means or other suitable remotely controllable mechanism which rotates the control surfaces and locks them in an adjusted position. The control mechanism effects selective rotation of tail surfaces 30 and 32 and ruddervators 38 and 40 about their respective axis of rotation.

Figure 2A:
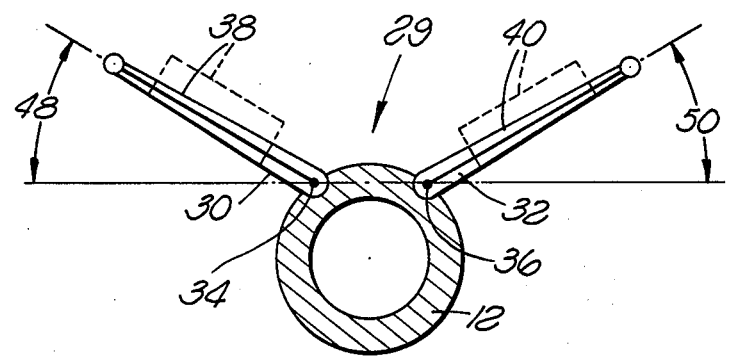
FIGS. 2a and 2b are detail sectional views taken along lines 2—2 of FIG. 1 illustrating various positions of the two tail control surfaces and respective ruddervators attached thereto.
Figure 2B:
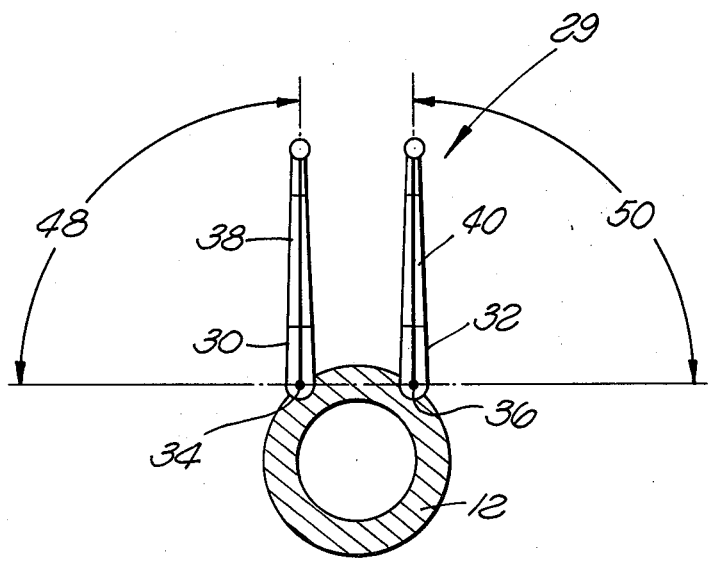

With further reference to FIG. 1, the center of gravity of the aircraft 10 is designated 15 while the wing center of pressure is designated 11 and 13 respectively for wings 14 and 16. As can be seen in FIG. 1, points 11 and 13 are in approximate horizontal alignment with center of gravity 15 (such that aircraft aerodynamic center corresponds to center of gravity 15). This is the normal condition for stable flight. However, the wing center of pressure shifts rearward with Mach number increase. This shift must be compensated for to obtain stable flight. Rather than using the prior art fuel shift technique, the present invention utilizes variable gamma tail unit 29. Optimally, aircraft 10 will have the supersonic wing center of pressure 11 and 13 aligned with the center of gravity 15 as shown in FIG. 1. As such, horizontal tail surface is desirable at subsonic speeds to counteract the moment arm about center of gravity 15 caused by forward position of wing center of pressure, i.e. such that aircraft aerodynamic center will correspond with center of gravity 15. However, during supersonic flight, horizontal tail surfaces are not necessary since wing center of pressure and the center of gravity would be aligned. In fact, the moment art of the horizontal tail would have to be compensated for during supersonic flight (as aerodynamic center would otherwise be moved rearwardly from center of gravity 15), as by the prior art fuel shift technique to vary the center of gravity. In any case, horizontal tail surfaces are eliminated with the present invention during supersonic flight which avoids use of the fuel shift apparatus and results in a reduction in minimum drag and provides the highest values of maximum lift-drag ratio at supersonic speeds. With reference now to FIGS. 2a and 2b, there is shown various positions of the tail control surfaces 30 and 32 and ruddervators 38 and 40 of the variable dihedral tail unit 29. In FIG. 2a, tail control surfaces 30 and 32 are in a position corresponding to a subsonic flight condition. Each of the tail control surfaces 30 and 32 is positioned at a dihedral angle 48 and 50 with respect to a horizontal plane passing through the hinge lines 34 and 36. Angles 48 and 50 are always equal in all flight regimes with movement of tail control surfaces 30 and 32 being synchronized such that surfaces 30 and 32 move in unison equally in opposite directions.

FIG. 2b illustrates the variable dihedral tail unit 29 with the tail control surfaces 30 and 32 in the supersonic mode where dihedral angles 48 and 50 are approximately 90°, i.e. parallel to the plane of symmetry of the aircraft. Tail control surfaces 30 and 32 are moveable through a range of optimally 45° from the substantially vertical position of FIG. 2b to a minimum dihedral angle position which normally would be at approximately 45° to a horizontal plane passing through the hinge line 34 and 36. In this fashion, tail control surfaces 30 and 32 are in essence moveable from a vertical tail position to a "Vee" tail position.

In operation, during takeoff and landing conditions, tail control surfaces 30 and 32 would be in their minimum dihedral angle position. In this position, the greatest amount of tail lift plus longitudinal stability and control would be provided. In addition, ruddervators 38 and 40 can be rotated to a downward position to further increase lift. In the minimum dihedral angle position, the "Vee" tail also provides adequate direction control. Thus, the "Vee" tail at the minimum dihedral angle acts as a horizontal and vertical stabilizer and at the maximum dihedral angle acts as a vertical stabilizer only.

While in subsonic flight, tail control surfaces 30 and 32 and ruddervators 38 and 40 will be positioned as required to give the desired flight conditions. Optimally, this would be accomplished by conventional automatic control equipment where pilot's stick commands would be inputted to a control configured computer which controls surface deflections of the aircraft in accordance with such inputs and with aircraft response. In this manner, the tail control surfaces 30 and 32 and ruddervators 38 and 40 (and other surfaces such as flaps 22 and 24, elevons 26 and 28, and slats 18 and 20) would be rotated as a function of aircraft flight parameters. Alternately, the position of the tail control surfaces 30 and 32 can be rotated within their range of movement simply as a function of position of center of pressure of the wings 14 and 16 (or equivalently aerodynamic center of the aircraft).

Once the aircraft has begun transition to supersonic flight, tail control surfaces 30 and 32 would be rotated upwardly as required by the control mechanism until attainment of supersonic speed at which time tail control surfaces 30 and 32 would be substantially vertical such as illustrated in FIG. 2b. In this condition, it is seen that the conventional horizontal tails are now eliminated because of the inherent design of the aircraft whereby the supersonic center of lift is coincident with the center of gravity. Trim is provided by elevons 26 and 28. As such, unnecessary drag due to such horizontal stabilizers, which in the present state of the art must be adjusted to neutralize lift, is avoided. In this supersonic flight condition, ruddervators 38 and 40 act purely as rudders. As such, the surface area used as rudders is increased over standard type aircraft with the result being increased directional stability at supersonic speeds where such is highly desired. Ruddervators 38 and 40 can also function as speed brakes if they are rotated outwardly from tail control surfaces 30 and 32 equally in opposite directions. If need be in supersonic flight, dihedral angle of tail control surfaces 30 and 32 can be reduced to less than 90° such that tail control surfaces 30 and 32 will act partially as horizontal stabilizers and such that rotation of ruddervators 38 and 40 outward from tail control surfaces 30 and 32 can provide a pitch control component.

The control system utilized in the present invention should be provided with a manual override. In this manner, a failsafe control system is provided and in addition, the tail control surfaces 30 and 32 can be positioned as a function of stealth. Thus, to minimize radar cross section from beneath the aircraft, tail control surfaces 30 and 32 can be positioned as illustrated in FIG. 2b to minimize radar reflection (elimination of horizontal tail reflection). This of course is not possible with conventional fixed or horizontally translating horizontal tails. To minimize radar cross section from above the aircraft. The tail control surfaces 30 and 32 would be rotated such that the dihedral angle is reduced such as in FIG. 2a. It has been found that this type of position substantially reduces radar reflection from above the aircraft as compared to the substantially vertical position as shown in FIG. 2b.

In view of the above, it should be understood that the present invention utilizes two tail surfaces as compared to the conventional three and obviates the need for fuel transfer systems to compensate for wing center of pressure shifts with Mach number. This reduces weight of the aircraft and allows for increase in fuel capacity. In addition, the present invention allows for safe takeoff and landing conditions and provides improved aerodynamic efficiency which also saves propulsion energy. The present invention also has the benefit of being adjustable to increase stealth.

Thus it is apparent that there has been provided, in accordance with the invention, a variable dihedral angle tail unit for supersonic aircraft that fully satisfies the objectives, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations which fall within the spirit and scope of the appended claims.

What is claimed is:

1. In an aircraft capable of supersonic flight having a fuselage, and a pair of wings connected to said fuselage, each of said wings projecting substantially horizontally and outwardly from said fuselage, a variable dihedral angle tail unit comprising:
   two tail control surfaces extending outwardly from said fuselage pivotally mounted to the upper body of the aft end of said fuselage about respective axes substantially parallel to the longitudinal axis of said fuselage, said tail control surfaces adapted to selectively provide both longitudinal and directional stability, said tail control surfaces being moveable within a range from a vertical position above said fuselage substantially parallel to the plane of symmetry of said aircraft to a predetermined minimum dihedral angle with respect to a horizontal plane passing through said axes; and
   positioning means for rotating in unison said tail control surfaces about said axes.

2. The aircraft of claim 1 wherein said positioning means rotates said tail control surfaces equally in opposite directions.

3. The aircraft of claim 2 wherein said positioning means rotates said control surfaces such that said tail control surfaces are in said vertical position above said fuselage during supersonic flight providing directional stability and substantially no longitudinal stability and in said predetermined minimum dihedral angle position during subsonic flight while in a takeoff or landing mode providing both longitudinal and directional stability.

4. The aircraft of claim 3 wherein said positioning means rotates said tail control surfaces within said range during subsonic flight as a function of aircraft flight parameters.

5. The aircraft of claim 4 wherein said tail control surfaces have a trailing edge swept outwardly from said fuselage, said tail control surfaces each have a ruddervator pivotally connected thereto, and said ruddervator is positioned along said trailing edge.

6. The aircraft of claim 5 wherein said positioning means rotates said ruddervators as a function of aircraft flight parameters.

7. The aircraft of claim 6 wherein said positioning means rotates said tail control surfaces as a function of stealth.

8. The aircraft of claim 2 wherein said positioning means rotates said tail control surfaces within said range during subsonic flight as a function of aircraft flight parameters.

9. The aircraft of claim 8 wherein said tail control surfaces have a trailing edge swept outwardly from said fuselage, said tail control surfaces each have a ruddervator pivotally connected thereto, and said ruddervator is positioned along said trailing edge.

10. The aircraft of claim 9 wherein said positioning means rotates said ruddervators as a function of aircraft flight parameters.

11. The aircraft of claim 2 wherein said positioning means rotates said tail control surfaces in said range as a function of position of wing center of pressure.

12. The aircraft of claim 2 wherein said tail control surfaces have a trailing edge swept outwardly from said fuselage, said tail control surfaces each have a ruddervator pivotally connected thereto, and said ruddervator is positioned along said trailing edge.

13. The aircraft of claim 2 wherein said positioning means rotates said tail control surfaces in said range as a function of stealth such that said tail control surfaces are positioned to present minimum radar cross section from a given direction.

14. The aircraft of claim 12 wherein said tail control surfaces have a trapezoidal shape.

15. A method of varying aircraft geometry to improve aerodynamic efficiency comprising the steps of:
   providing an aircraft capable of supersonic flight, said aircraft having a fuselage, a pair of wings mounted to said fuselage, and a variable dihedral angle tail unit, said variable dihedral angle tail unit comprising two tail control surfaces extending outwardly from said fuselage, said tail control surfaces being pivotally mounted to the upper body of the aft end of said fuselage about respective axes substantially parallel to the longitudinal axis of said fuselage, said tail control surfaces adapted to selectively provide both longitudinal and directional stability, said tail control surfaces being moveable within a range from a vertical position above said fuselage substantially parallel to the plane of symmetry of said aircraft to a predetermined minimum dihedral angle position with respect to a horizontal plane passing through said axes;

rotating in unison within said range during subsonic flight said tail control surfaces in accordance with at least one flight parameter to provide both longitudinal and directional stability to said aircraft; and positioning said tail control surfaces in said vertical position above said fuselage during supersonic flight such that directional stability and substantially no longitudinal stability is provided to the aircraft by said tail control surfaces.

16. The method of claim 15 wherein said rotating step is other than when said aircraft is in a takeoff or landing mode, and also including the step of positioning said tail control surfaces in said predetermined minimum dihedral angle position while said aircraft is in a takeoff or landing mode.

17. The method of claims 15 or 16 wherein said at least one flight parameter is position of wing center of pressure.

18. The method of claims 15 or 16 also including the step of selectively overriding the positioning of said tail control surfaces according to said rotating and positioning steps to position said tail control surfaces as a function of stealth such that said tail control surfaces are positioned to present minimum radar cross section from a given direction.

* * * * *